(12) United States Patent
Reim

(10) Patent No.: US 6,567,497 B2
(45) Date of Patent: May 20, 2003

(54) METHOD AND APPARATUS FOR INSPECTING A STRUCTURE USING X-RAYS

(75) Inventor: Richard Reim, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/838,204

(22) Filed: Apr. 20, 2001

(65) Prior Publication Data

US 2002/0154734 A1 Oct. 24, 2002

(51) Int. Cl.$^7$ ............................................... G01N 23/04
(52) U.S. Cl. ......................................... 378/62; 378/143
(58) Field of Search ............... 378/143, 62; 250/370.11

(56) References Cited

U.S. PATENT DOCUMENTS

| | | | |
|---|---|---|---|
| 3,584,219 A | * | 6/1971 | Herglotz ..................... 378/143 |
| 4,675,890 A | * | 6/1987 | Plessis et al. ............... 378/143 |
| 4,694,171 A | | 9/1987 | Hosoi et al. |
| 4,933,562 A | * | 6/1990 | Roziere ................. 250/370.11 |
| 4,942,300 A | | 7/1990 | Mori et al. |
| 5,065,029 A | | 11/1991 | Krivanek |
| 5,401,964 A | | 3/1995 | Mancuso |
| 5,517,033 A | | 5/1996 | Krivanek et al. |
| 5,552,602 A | | 9/1996 | Kakibayashi et al. |
| 5,747,803 A | | 5/1998 | Doong |
| 5,811,805 A | | 9/1998 | Osakabe et al. |

OTHER PUBLICATIONS

Transmitted Microfocus X–Ray Techniques, by Richard Reim, ISTFA 1992; The 18$^{th}$ International Symposium for Testing & Failure Analysis, LA, CA, Oct. 17–23, 1992, pp. 279–287.

* cited by examiner

*Primary Examiner*—Craig E. Church
(74) *Attorney, Agent, or Firm*—Burns, Doane, Swecker & Mathis, LLP

(57) ABSTRACT

The present invention is directed to an apparatus and method for examining small structures such as micro circuit structures. Exemplary embodiments can generate narrow electron beams for examining the micro circuits, and can eliminate the traversing of the x-rays through materials other than a target material and the sample structure. Exemplary embodiments eliminate having the x-rays traverse both a wafer and a plating target on the wafer being examined, by using a target material placed closer to the sample structure. Exemplary embodiments provide adequate magnification to perform fault analysis of small structures and provide an adequate contrast pattern for viewing images of the micro circuit being examined.

34 Claims, 5 Drawing Sheets

METHOD AND APPARATUS FOR INSPECTING A STRUCTURE USING X-RAYS

BACKGROUND OF THE INVENTION

1. Field of the Invention

The present invention relates to failure analysis and more particularly to a method and apparatus for analyzing defects or verifying structures in electrical components such as microcircuits.

2. Background Information

Conventional examination of structures, such as electrical components, is often accomplished by the use of x-ray systems. An example of an x-ray system that has been used for this purpose is the Fein Focus FSX-100 system, which is a transmitted real time x-ray system.

In a Fein Focus FSX-100 system a sample structure to be examined is positioned near the x-ray tube. The x-ray tube generates an electron beam, which is accelerated to a high velocity while traversing an electric field, and is directed towards a beryllium wafer located at the end of the tube. The beryllium wafer has a tungsten plating coated on it. Because this tungsten plating constitutes the target for the electron beam, it represents the target material for the accelerated electron beam. Upon striking the tungsten plating, x-rays are generated. The generated x-rays travel through the remaining tungsten plating, made up of tungsten atoms, and through the beryllium wafer leaving the vacuum environment of the x-ray tube.

The depth of penetration of the electron beam into the target material varies with the acceleration voltage. X-ray machines are typically designed so the acceleration voltage can be varied. A problem with this arrangement is that the target material must be thick enough to accommodate all acceleration voltages. By design, x-ray systems therefore use a target material that is thicker than needed. The electron beam thus penetrates a small percent of the target thickness when lower acceleration voltages are used. The x-rays that are generated must then pass through the remaining target thickness, which results in loss of contrast as the size of the sample structure is decreased.

The use of this x-ray system can thus lead to an invisible contrast pattern. For example, where the electron beam is approximately 3 to 5 microns in diameter when it hits the target, the system's resolution is inadequate for examining microcircuits where the spacing between the circuitry is less than the 3 to 5 micron diameter of the beam.

Contrast is further diminished when the x-rays travel through other materials. That is, once x-rays have penetrated the sample structure, they enter an image intensifier tube, which is another vacuum device like the x-ray tube. The x-rays travel through the outer support material of the image intensifier tube, which can, for example be formed as an aluminum baseplate which is about 10 inches in diameter. The x-rays enter the image intensifier tube where they are converted into light, and then into electrons utilizing both phosphor and photo cathode materials. The electrons are then amplified and converted by a phosphor into light photons where a charged coupled device (CCD) video camera displays the image on a monitor.

Because the x-rays travel through materials other than the sample structure, the system's contrast is limited. In addition, the electron beam diameter limits the system's resolution. Present x-ray systems can magnify up to 300 times but this again only provides limited enhancement. Because the sample structure is located in the x-ray chamber where no vacuum is present, this also limits the ability to improve resolution. The foregoing limitations preclude accurate examination of small structures, such as the circuitry inside microcircuits.

Thus, it would be desirable to provide systems and techniques for accurately examining microcircuits.

SUMMARY OF THE INVENTION

The present invention is directed to an apparatus and method for examining small structures such as microcircuit structures. Exemplary embodiments can generate narrow electron beams for examining the microcircuits, and can eliminate the traversing of the x-rays through materials other than a target material and the sample structure. Exemplary embodiments eliminate having the x-rays traverse both a wafer and a plating target on the wafer by using a target material of proper thickness placed closer to the sample structure. Exemplary embodiments provide adequate magnification to perform fault analysis of small structures and provide an adequate contrast pattern for viewing images of the microcircuit being examined.

Generally speaking, the present invention relates to a method and apparatus for inspecting a structure. Exemplary embodiments comprise means for supporting a target material; means for supplying an electron beam to the target material to convert the electron beam into x-ray radiation, which is emitted directly into a structure to be inspected; and means for producing an image using x-ray radiation emitted from the structure to be inspected.

In other exemplary embodiments, an apparatus for inspecting a structure comprises an electron beam generator for supplying an electron beam to an inspection area; a target material for generating x-rays in response to the electron beam; an x-ray phosphor, located a predetermined distance from at least a portion of the inspection area, for receiving the x-rays from the target material; means adjacent to the x-ray phosphor for receiving light photons produced by the x-ray phosphor as an image of a structure included in the inspection area and for producing an image of the structure.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE INVENTION

Figure 1:
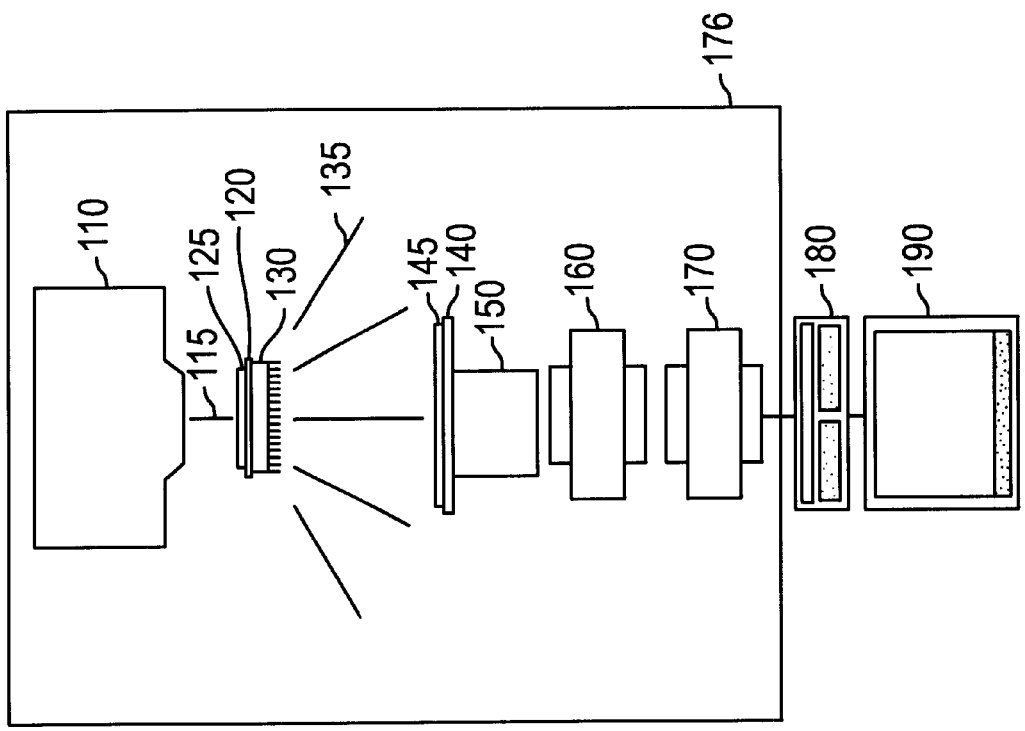
FIG. 1 illustrates an apparatus according to an exemplary embodiment of the present invention.

FIG. 1 illustrates an exemplary apparatus 100 for inspecting a sample placed within a sample inspection area of the apparatus. The apparatus 100 includes a means for supporting a target formed as a target material 125, represented as a glass cover slide 120. A structure to be inspected, such as a sample device 130, which is placed in the sample inspection area, can also be used to support the target material 125 in alternate embodiments. The sample device 130 can, for example, be a microcircuit die of microcircuit structures.

The apparatus comprises means for supplying an electron beam to the target material 125 to convert the electron beam into x-ray radiation, which is emitted directly into a structure to be inspected (e.g., sample device 130). The electron beam can be generated by any known electron beam generator, such as a scanning electron microscope 110 for emitting an electron beam 115 (e.g., a 1–40 KeV, or lesser or greater, and 100 pA-1 nA, or lesser or greater, electron beam). For example, a 30–40 KeV electron beam can be used to produce adequate excitation in exemplary embodiments described herein. The electron beam is emitted at the glass cover slide 120 having target material 125 placed (e.g., deposited) thereon. The glass cover slide having target material placed thereon serves to direct an electron beam towards an inspection area where the structure to be inspected is located. In one embodiment, glass cover slide 120 can have plural apertures filled with the target material that emit x-rays in response to the electron beam.

The glass cover slide 120 can be independently supported above a structure to be inspected, or can be placed on the sample device 130 being examined. For example, the target material, and/or the sample device can be optionally supported on a retractable arm, such as the retractable arm of a backscatter detector included in known scanning electron microscopes. The target material can, as a result, be moveable in any or all of the x, y and z axes, or any desired axis.

The electron beam 115, upon striking the target material 125 results in stimulation of the target material 125, with x-rays being generated in response which traverse the sample device, or structure, 130. X-rays which traverse the sample device 130 strike a transparent material coated with a luminescent material, such as an x-ray phosphor. For example, a glass plate 140 having an x-ray phosphor material 145 applied thereto can be used. The transparent material can be located a predetermined distance from at least a portion of the inspection area for receiving the x-rays from the target material via the inspection area. The energy of the x-rays causes excitation of the phosphor material 145 resulting in visible radiation of energy, which corresponds to images of the sample device.

Means are provided adjacent to the x-ray phosphor for receiving light photons produced by the x-ray phosphor and for producing an image of the structure included in the inspection area. That is, an image of the sample device is produced using x-ray radiation emitted from the structure to be inspected. For example, in one embodiment, a lens can be placed adjacent to the transparent material for focusing light photons produced by the x-ray phosphor into a focused image. The imaging means is represented in the FIG. 1 example as a macro lens 150. The images can be intensified, or amplified, using, for example, a light amplifier represented in FIG. 1 as a night vision tube 160, and captured using any known image capture device including, but not limited to, a CCD camera 170. For example, the CCD camera 170 can be an astronomy type CCD imager such as that available from Santa Barbara Instrument Group (SBIG) of Santa Barbara, Calif. The images can then be processed by image processor 180 and displayed on a display of the output means, such as a monitor 190.

An electron beam for causing x-ray generation need not be a strong beam when, for example, examining small structures such as microcircuits. To examine subsurface layers such as metallization layers and microcircuit layers, an electron beam with an accelerated voltage of approximately 40 KeV, or lesser or greater, is adequate, provided sufficient energy of the x-rays resulting from the accelerated electron beam striking the target material is achieved.

According to exemplary embodiments of the present invention, a thin target material (e.g., on the order of 1000 Å, or lesser, or greater) can be used. In exemplary embodiments, the type of material to be used can be determined by using the Monte Carlo Scattering Pattern, which indicates how thick the target material 125 must be for the beam to adequately penetrate substantially through the target material. In this context, "substantially" is about 90% to 100% (more or less) of the depth of the material.

In exemplary embodiments, the target material can be close to the surface of the microcircuit that is being examined. In this context, "close" is approximately one thousandth of an inch, or lesser or greater, off the microcircuit surface. The target material thickness can be approximately 1000 Å to 3000 Å, or lesser or greater, and depends on the target material being used. This target material can, for example, be molybdenum, tungsten, ruthenium, rhodium, niobium, silver, zirconium, palladium, or any other target material that, for a given electron beam energy, possesses enough energy to produce an x-ray photon of sufficient energy to excite the x-ray phosphor.

When using tungsten, the strongest x-ray generated is an exemplary embodiment is about 58 KeV (or lesser or greater) when an electron beam strikes the tungsten. At least about 1.5 times this 58 KeV can obtain a good response or excitation from tungsten atoms. The target material can be selected in accordance with the limits of any equipment used, such as the acceleration voltage limits of the scanning electron microscope. For example, tungsten material can be used where the scanning electron microscope 110 has approximately 87 KeV of accelerated voltage to obtain a 58 KeV x-ray. If the target material being used is molybdenum, for example, a relatively smaller accelerated voltage is adequate to generate x-rays that penetrate through the entire sample. Palladium can also be used to obtain a response to an electron beam of approximately 30 KeV to generate 21 KeV x-ray radiation.

The placement of the target material such that x-ray radiation is emitted substantially directly into a structure to be examined (e.g., the target material is within one thousandth of an inch of the sample device 130) can be accomplished by placing the target material 125 within a plurality of apertures on the glass cover slide 120. To place the target material sufficiently close to the sample device 130 such that x-rays radiate directly into the sample device, the glass cover slide 120 is placed above the sample device 130 on which the target material 125 can be deposited. To bring the target material 125 even closer to the sample device 130 such that x-rays are even more directly emitted into the sample device, glass cover slide 120 can have a plurality of apertures formed therein using a known technique including, but not limited to etching techniques.

Figure 2:
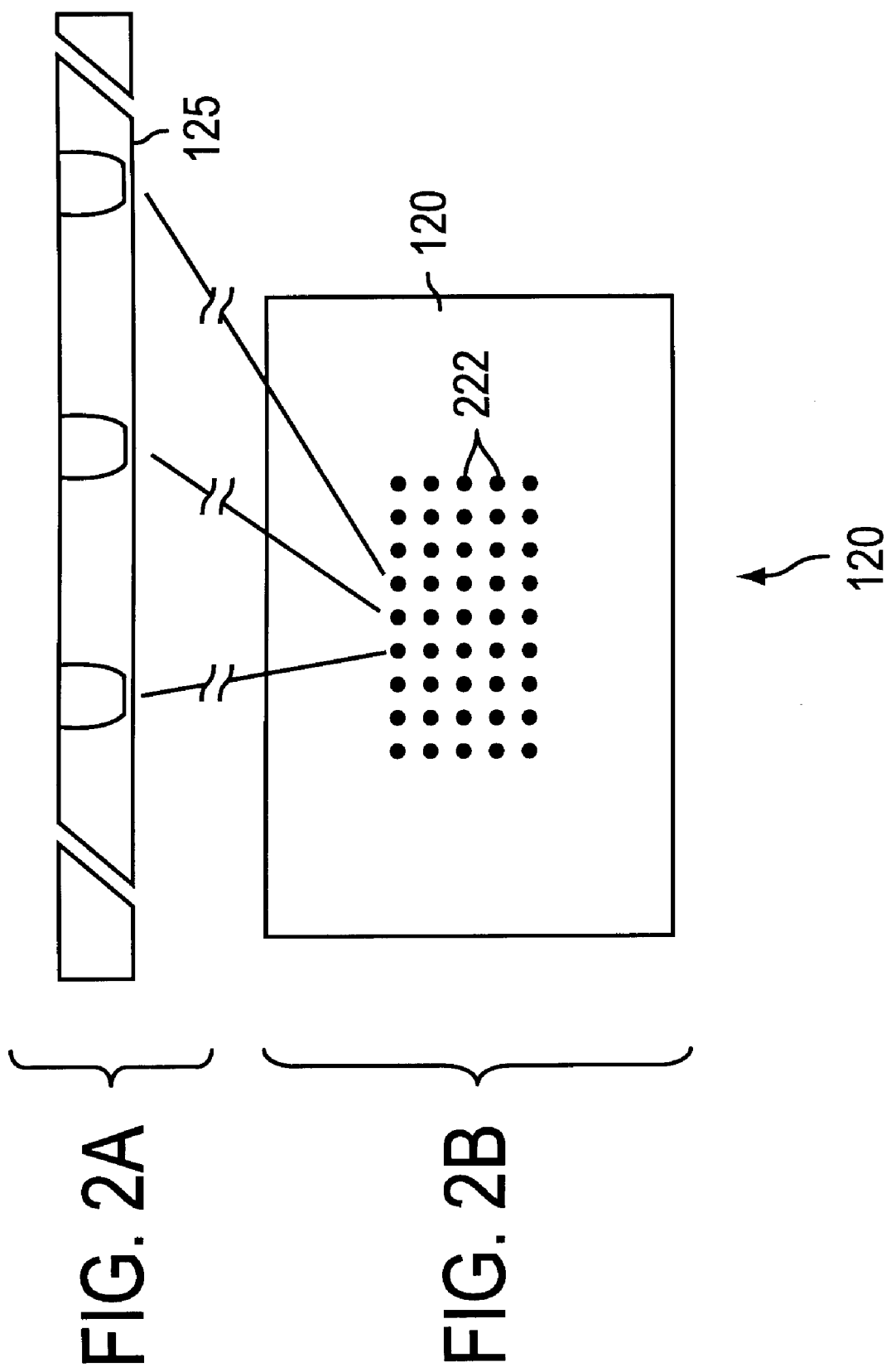
FIGS. 2A and 2B illustrate a directing means according to an exemplary embodiment of the present invention.

FIGS. 2A and 2B illustrate a side view and a top view of an exemplary embodiment of the glass cover slide 120. In the FIGS. 2A and 2B, the glass cover slide 120 is approximately one hundredth of an inch in thickness and has a plurality of apertures 222 etched in its surface to form passages through the depth of the glass cover slide 120. In alternate embodiments, the apertures need not extend completely through the glass cover slide provided satisfactory resolution of inspection is achieved. In alternate embodiments, the glass cover slide can be replaced with any structural material that is etchable, for example silicon wafer material. The apertures 222 are approximately one hundredth of an inch in diameter (more of less). These apertures 222 direct the electron beam 115 onto specific portions of the sample device 130 that is to be examined. An electron beam of less than 3 microns is diameter can be directed through these apertures towards the sample device. By having a target material 125 with a thickness of 1000 Å to 3000 Å, the distance the x-rays traverse after striking the target material 125 is also reduced.

To achieve additional accuracy and improved resolution when inspecting sample device, the electron microscope according to one exemplary embodiment can be placed in spot mode. In the spot mode, rather than raster scanning the electron beam, the electron microscope emits a straight beam. The electron microscope can be used in raster mode to generate a frozen image of the sample and target apertures. The electron microscope can then use the frozen image to direct the electron beam, while in spot mode, over the target aperture of choice.

Referring to FIGS. 2A and 2B, after the electron beam 115 passes into the apertures 222 and strikes the target material 125, x-rays 135 are generated in all directions. These x-rays propagate through the sample device 130. When inspecting a given sample device 130, the sample can be thinned out to allow enhanced inspection of the remaining structures of the sample to obtain a better contrast image.

Referring to FIG. 1, the energy of the x-rays 135 which are radiated from the target material 125 excites the x-ray phosphor material 145 on the glass plate 140 sufficiently to illuminate the phosphor. The phosphor can, for example, be gadolinium oxy-sulfide, can be doped with a plurality of different elements, or can be any material or combination of materials which will produce a detectable image upon impact by the x-rays. For gadolinium oxy-sulfide to emit a detectable response to the x-rays, the x-ray energy has to be at least about 12 KeV. The gadolinium oxy-sulfide can also be doped with other elements such as terbium, for example, and/or europium. Other x-ray phosphors can also be used, for example cesium iodine, as long as the x-ray has enough energy to produce a light output.

The glass plate 140 is associated with (e.g., placed on) a focusing means, which includes, for example, a macro lens 150 to focus the image of the sample device, which is impacted by the x-rays 135. In an exemplary embodiment, the glass plate 140 with the x-ray phosphor material 145 and macro lens 150 can be about 1 to 2 inches (or lesser or greater, as desired) from the sample device 130. The arrangement of the glass plate 140 and the macro lens 150 can, in an alternate embodiment be placed in a vacuum which leads to additional advantages, such as not having a need for support material.

For example, elements from the scanning electron microscope 110 to the light amplifier 160 and an imaging means represented in FIG. 1 as a camera 170, inclusive, can be placed within a vacuum chamber 176. The vacuum chamber can be configured in known fashion to permit access to the sample inspection area where the sample device 130 is to be placed, and to accommodate a link (e.g., video cable link) to permit captured images to be displayed in real time outside the vacuum chamber.

The macro lens can be optionally operatively attached to any light amplifier(s) including, but not limited to, a Generation II, Generation III, or Generation IV Night Vision Tube 160 available from, for example, Litton Electro-Optical Systems of Garland, Tex. and Tempe, Ariz. This tube is a light amplifier, which amplifies light by a factor of about 50,000, although any suitable light amplifier having any desired amplification factor can be chosen. An amplification of up to 2 million times or greater can be selected depending on the number of microchannel plates placed within the night vision tube 160. Image information emitted by the x-ray phosphor coated glass plate 140 and focused by the macro lens 150 is amplified by the night vision tube 160. The night vision tube 160 can be between 2 and 3 inches in length, more or less.

The light amplifier can be coupled to imaging means represented, for example, as a standard video camera (e.g., a charge coupled device (CCD) camera or any other camera) 170 for capturing the image. The imaging means can optionally include an associated image processor. That is, the output of the camera can be directed over a conventional video cable to be optionally processed by an image processor 180 to improve the image resolution by, for example, averaging it out to make it smoother or providing any image modification to permit a desired display of output information. An output of the imaging means can be connected to an output device such as a television monitor 190 or any known display.

Figure 3:
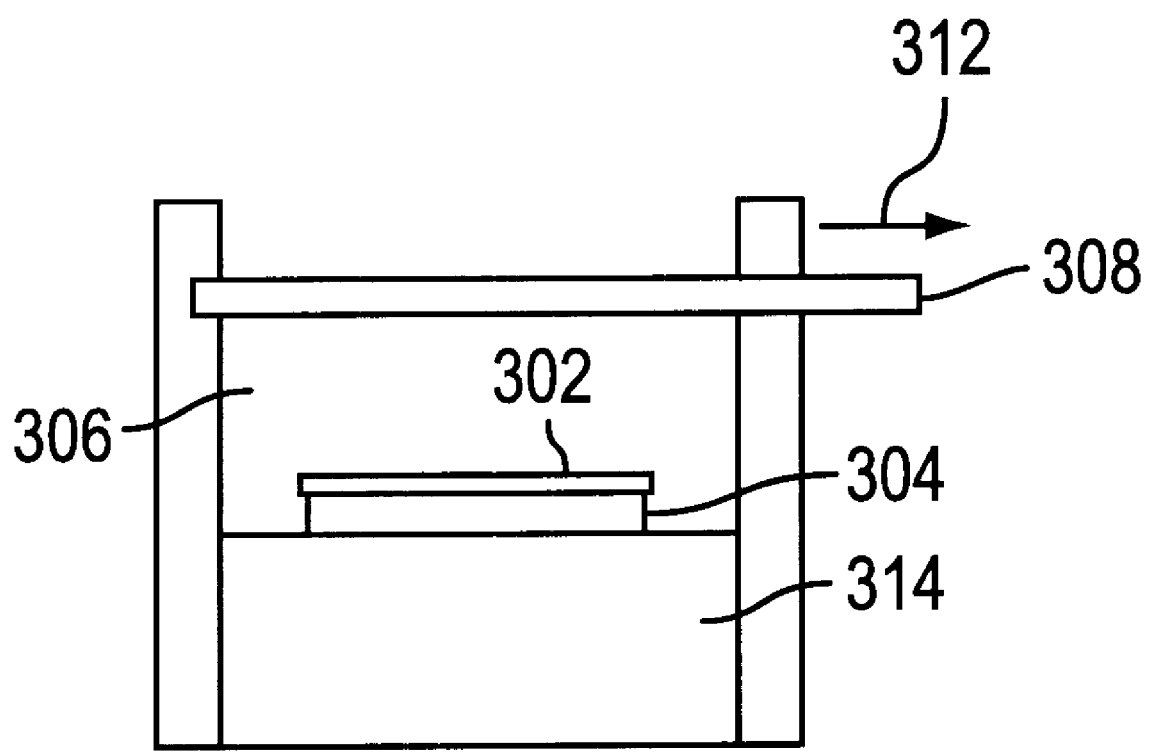
FIG. 3 illustrates an alternate embodiment of an x-ray detection.

FIG. 3 shows an alternate embodiment of an x-ray detector for capturing the image. In this embodiment, a luminescent material, such as an x-ray phosphor 302, can be applied (e.g., coated or deposited) directly on the microstructures of the image capture device, such as a charged coupled device (CCD) microchip 304 placed within a vacuum chamber 306 sealed by a mechanical slider 308. The mechanical slider 308 is shown in a closed position, for sample changes, but can be moved in the direction of arrow 312 to an open position at which operation can take place. The image can be integrated over time to improve signal to noise (S/N) ratio. A standard CCD camera used for astro-imaging can be used to accommodate the process. This alternate embodiment eliminates the glass plate, macro lens, and night vision tube. For x-ray phosphors that are susceptible to degraded performance due to contact with air, the mechanical slider 308 serves as a protective shield that can mechanically slide over the x-ray phosphor to protect it while the sample device is changed. This would keep the x-ray phosphor under vacuum during sample changing. Better performance of the CCD chip can be accomplished by cooling with a peltier cooler 312.

Figure 4:
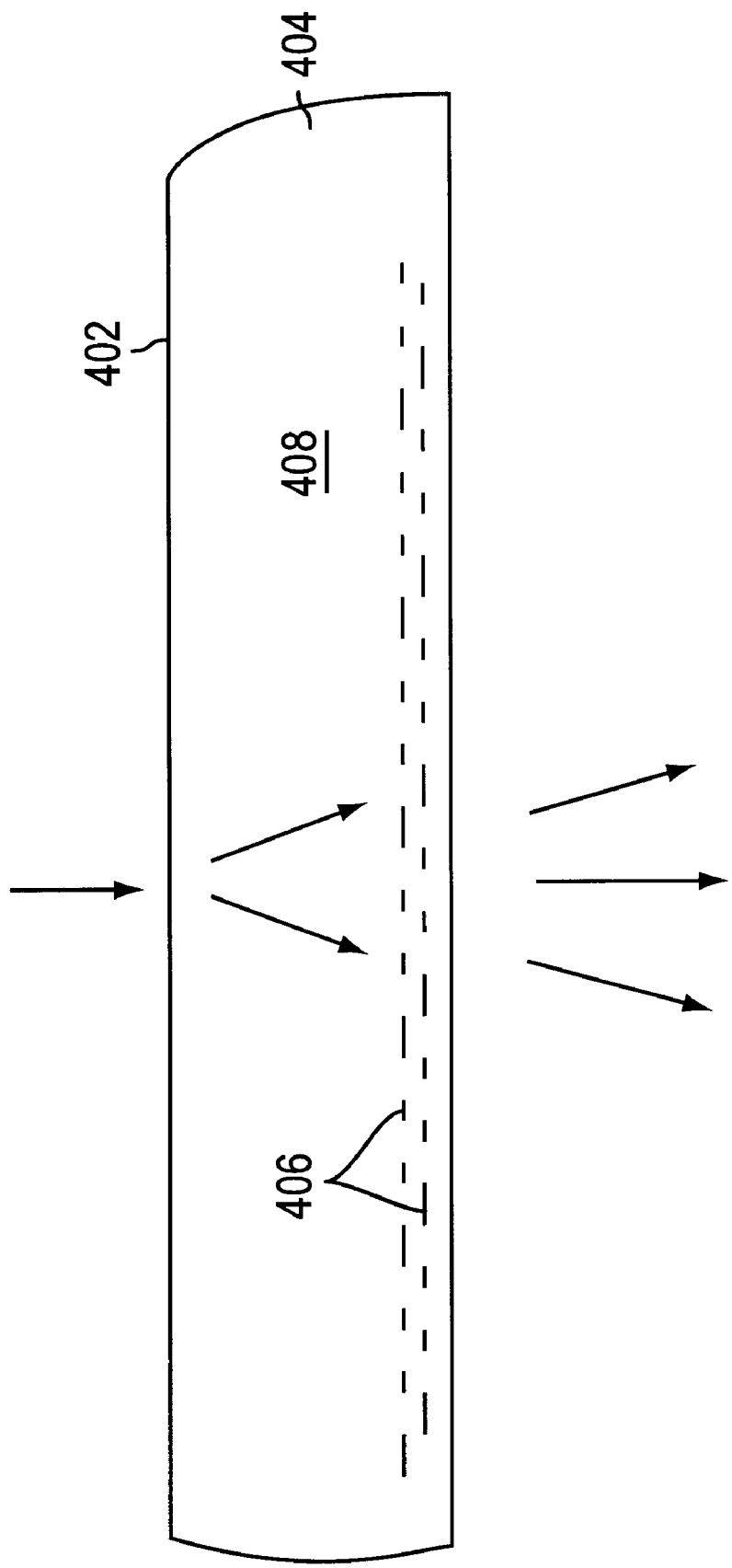
FIG. 4 shows an embodiment of the present invention.

FIG. 4 shows an alternate exemplary embodiment of the present invention, and in particular, an exemplary target material/sample device configuration. Rather than placing a target structure just above (e.g., 1 mil) a microcircuit die surface, the exemplary FIG. 4 embodiment includes a target material 402, like molybdenum, plated below the microcircuit structure (e.g., on the order of 1 mil below, or lesser or greater). That is, the structure to be inspected is used as the target material supporting means. This can be done, for example, by mechanically thinning the silicon die 404 to approximately 80–140 μm, or lesser or greater. In the exemplary FIG. 4 illustration, the microcircuit structure is represented as microcircuit conductors 406 formed in a thinned silicon die 404 of 20 μm. A "multietch system", such as that available from Nisene Technology, can be used to thin the die down to 10–20 μm. After the die is thinned (for example, to 20 um) the molybdenum can be deposited directly on the backside etched silicon surface in any desired thickness (e.g., 3000 Å or thinner).

The silicon die 404, with the target material on its backside, has been inverted in the FIG. 4 illustration so that the electron beam will impact the target material (e.g., molybdenum) before passing into the die. In the FIG. 4 illustration, the target material 402 is placed onto the backside of the die, away from a side which includes the microcircuit conductors 406. However, those skilled in the art will appreciate that the target material can be placed at any location, provided it is sufficiently distant from the microcircuit conductors to avoid detrimentally affecting them (e.g., no closer than 10 kÅ, more or less).

The electron beam can be directed through the molybdenum, with x-rays generated in the molybdenum and silicon. However, in an exemplary embodiment, the x-rays generated in the silicon (e.g., 1.7 KeV) do not have enough energy to excite the x-ray phosphor which, in any exemplary embodiment, requires on the order of 12 KeV. Because only the x-rays generate din the molybdenum will excite the x-ray phosphor, a smaller diameter of usable x-rays results. That is, because the electrons fan out into a bulb-like shape in the silicon, and not in the molybdenum target material, a narrower effective beam results. That is, the electron beam remains relatively narrow in diameter throughout the target material, and only widens significantly after entering the silicon. As such, enhanced contrast and resolution can be achieved by using a narrower, effective electron beam. Although less x-ray counts result longer, integration times can be used to compensate with the astronomy (astro-imaging) type CCD camera.

Figure 5:
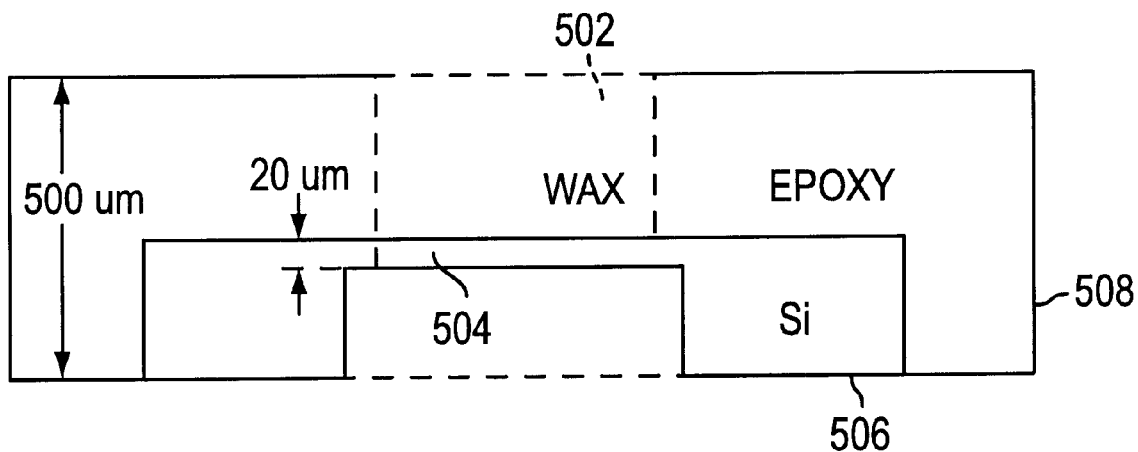
FIG. 5 shows an exemplary method for forming a sample device with a target material thereon for inspection in accordance with an exemplary embodiment of the present invention.

To provide sufficient structure to examine the thinned out silicon die, sections of the silicon die surrounding the thinned out portion can be retained with a thickness substantially greater than that of the thinned out portion (e.g., non-thinned-out portions can be on the order of 500 µm, or lesser or greater) To prepare the exemplary thinned silicon die of FIG. 4 for examination, any known technique can be used. FIG. 5 shows one exemplary method for forming a sample device with a target material thereon for inspection in accordance with the exemplary FIG. 4 embodiment. Referring to FIG. 5, a soluble, etchable, dissolvable wax 502 is first applied over the area 504 of the silicon die 506 to be thinned out. The silicon die, with the wax placed thereon, is then dipped into an epoxy, to form a stable epoxy structure 508 about the silicon, as shown. Afterwards, the silicon is thinned out beneath the wax. To provide access to the thinned out portion of the silicon die using the electron beam, the wax can be dissolved. The resultant structure is ready to examine using the electron beam, after the target material has been coated onto the thinned out portion.

Figure 6:
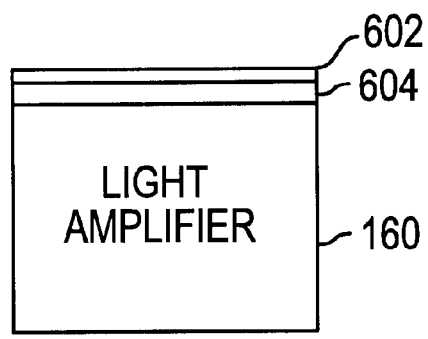
FIG. 6 shows an alternate embodiment of the present invention for applying a phosphor material.

In accordance with yet another embodiment of the present invention shown in FIG. 6, the x-ray phosphor material 145 can be deposited directly on the light amplifier 160. For example, where the light amplifier is the Generation II Night Vision Tube, an x-ray phosphor material 602 can be applied (e.g., coated or deposited) on a fiber optic input surface, or faceplate, of the night vision tube. However, those skilled in the art will appreciate that the x-ray phosphor material can be placed at any location where it can receive x-rays from the target material, for conversion into photons.

It will be appreciated by those skilled in the art the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. An apparatus for inspecting a structure comprising:

means for supporting a target material;

means for supplying an electron beam to the target material to convert the electron beam into x-ray radiation which is emitted directly into a structure to be inspected; and means for producing an image using x-ray radiation emitted from the structure to be inspected, wherein the supporting means comprises:

a glass cover slide having a plurality of apertures formed in the glass cover.

2. The apparatus of claim 1, wherein the apertures have a target material deposited therein, said target material emitting X-ray radiation in response to electron beam stimulation.

3. The apparatus of claim 2, wherein the target material is at least one of molybdenum and palladium.

4. The apparatus of claim 3, wherein the target material has a thickness in a range of 1000 to 3000 Angstroms.

5. An apparatus for inspecting a structure comprising:

means for supporting a target material;

means for supplying an electron beam to the target material to convert the electron beam into x-ray radiation which is emitted directly into a structure to be inspected; and means for producing an image using x-ray radiation emitted from the structure to be inspected, wherein the structure to be inspected is used as the target material supporting means.

6. The apparatus of claim 5, wherein the producing means comprises:

transparent material having a luminescent material deposited thereon for receiving the x-ray radiation.

7. The apparatus of claim 6, wherein the luminescent material is a phosphor material.

8. The apparatus of claim 7, wherein the phosphor material is one of gadolinium oxy-sulfide doped with at least one of terbium and europium.

9. The apparatus of claim 6, wherein the producing means comprises:

a macro lens for focusing an image received from the luminescent material to provide a focused image.

10. The apparatus of claim 9, wherein the producing means comprises:

a photo amplification means for amplifying the focused image.

11. The apparatus of claim 5, wherein the producing means comprises:

a photo amplification means for amplifying the image; and a luminescent material applied on a faceplate of the photo amplification means.

12. The apparatus of claim 5, wherein the producing means includes:

an image capture device for capturing the image emitted from the structure; and a luminescent material applied on the image capture device.

13. A method for inspecting a structure comprising the steps of:

forming a support with a target material;

supplying an electron beam onto a surface of said target material in a vacuum to convert the electron beam into x-ray radiation which is emitted into a structure to be inspected within the vacuum; and producing an image using x-ray radiation emitted from the target material to be inspected.

14. The method of claim 13 wherein the image is produced in the vacuum.

15. The method of claim 14, comprising:

directing the electron beam through target material placed in at least one aperture etched in a glass slide.

16. The method of claim 15, wherein the glass slide includes plural apertures which each have target material deposited therein, the target material emitting x-ray radiation in response to electron beam stimulation.

17. The method of claim 16, wherein the target material is at least one of molybdenum and palladium.

18. The method of claim 17, wherein the target material has a thickness in a range of 1000 to 3000 Angstroms.

19. The method of claim 14, the producing of the image comprising:

focusing an image received via the x-ray radiation to provide a focused image.

20. The method of claim 19, comprising:

amplifying the focused image with a photo amplifier.

21. An apparatus for inspecting a structure, comprising:

an electron beam generator for supplying an electron beam to an inspection area, the inspection area being located in a vacuum;

a target material located in the vacuum for generating x-rays in response to the electron beam;

an x-ray phosphor, located a predetermined distance from at least a portion of the inspection area, for receiving the x-rays from the target material;

means adjacent to the x-ray phosphor for receiving light photons produced by the x-ray phosphor as an image of a structure included in the inspection area and for producing an image of the structure.

22. The apparatus of claim 21, comprising:

a lens for focusing the light photons into a focused image;

a photo amplification means for amplifying the focused image into an amplified image; and an image capturing means for capturing the amplified image as a captured image.

23. The apparatus of claim 21, wherein the target material is applied to the apertures of a target material support, the target material emitting x-rays in response to electron beam stimulation.

24. The apparatus of claim 21, wherein the target material is at least one of molybdenum and palladium.

25. The apparatus of claim 21, wherein the target material has a thickness in a range of 1000 to 3000 Angstroms.

26. The apparatus of claim 21, comprising:

a transparent material having the x-ray phosphor applied thereon which illuminates in response to x-ray stimulation.

27. The apparatus of claim 26, wherein the phosphor material is one of gadolinium oxy-sulfide doped with at least one of terbium and europium.

28. The apparatus of claim 22, wherein the lens is a macro lens.

29. The apparatus of claim 21, wherein the electron beam is less than 3 microns in diameter.

30. The apparatus of claim 21, wherein electrons of the electron beam are accelerated by an electrical field up to 40 KeV.

31. The apparatus of claim 22, wherein the photo amplification means is a night vision tube.

32. The apparatus of claim 21, wherein the x-ray phosphor is applied on a faceplate of a photo amplification means.

33. The apparatus of claim 21, comprising:

an image capture device for capturing the image, the x-ray phosphor being applied on the image capture device.

34. The apparatus of claim 21, wherein the target material is applied to the structure to be inspected.

* * * * *